UNITED STATES PATENT OFFICE.

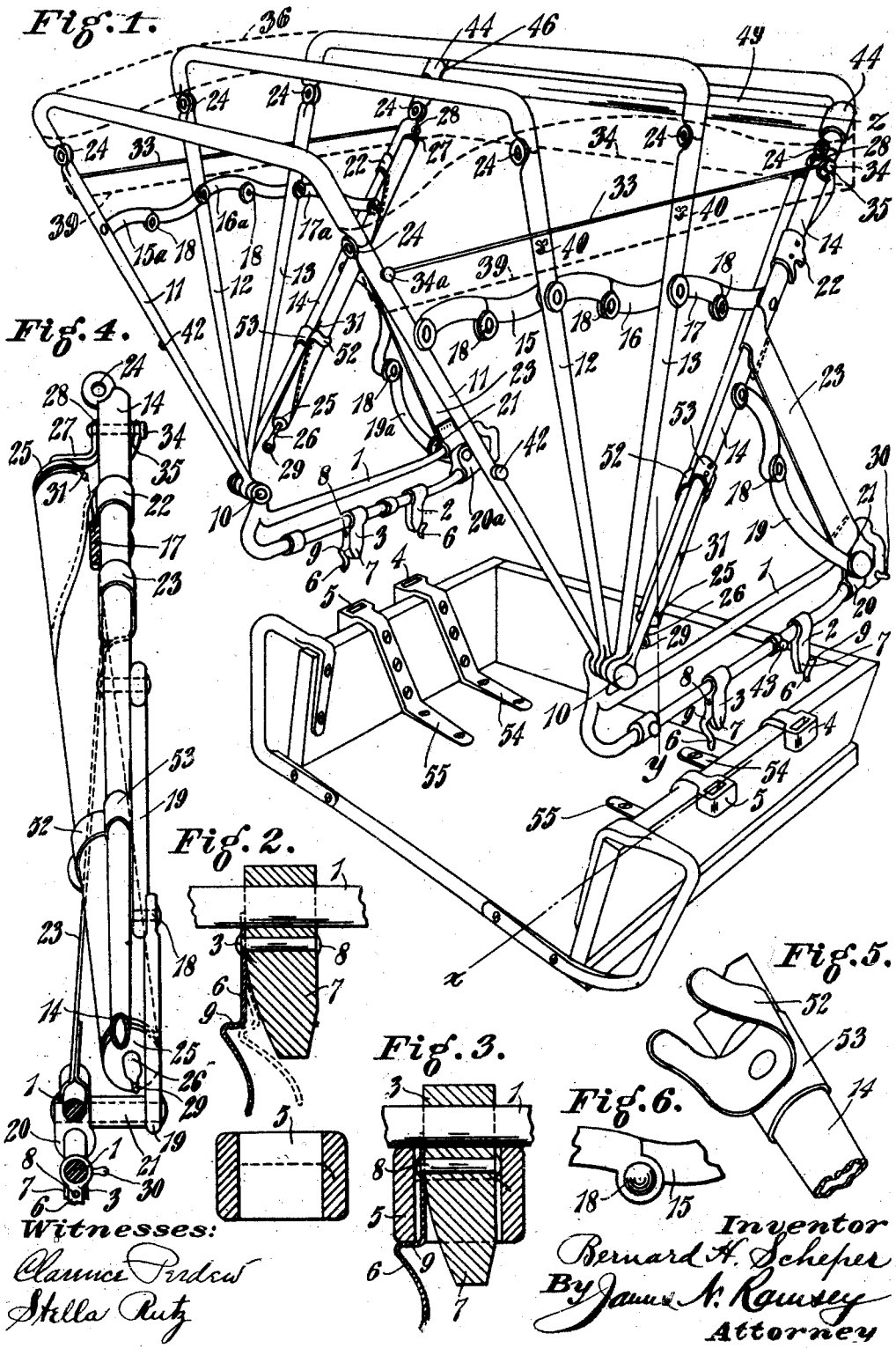

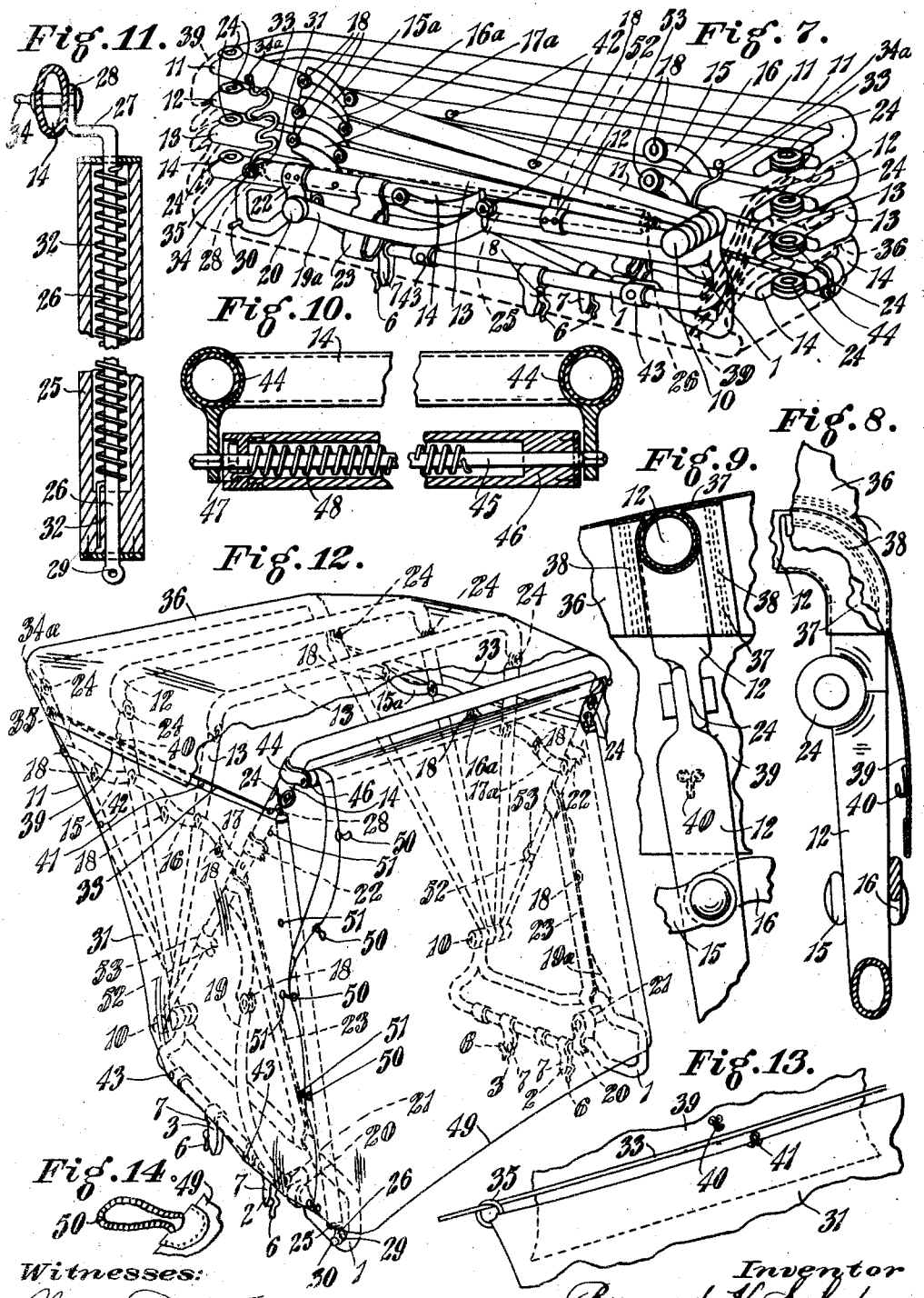

BERNARD H. SCHEPER, OF LEXINGTON PIKE, KENTON COUNTY, KENTUCKY.

VEHICLE-TOP.

No. 882,914.   Specification of Letters Patent.   Patented March 24, 1908.

Application filed October 7, 1907. Serial No. 396,198.

*To all whom it may concern:*

Be it known that I, BERNARD H. SCHEPER, a citizen of the United States, residing on Lexington Pike, Kenton county, Kentucky, have invented certain new and useful Improvements in Vehicle-Tops, of which the following is a specification.

My invention relates to tops for vehicles and the like, the object being to provide a removable top adapted for carrying in the vehicle to be used as occasion demands.

My invention consists in a series of bows adapted to fold down upon their support, and to also fold together with the support, together with the details of construction and arrangement of parts, as will hereinafter be more fully described and claimed.

In the drawings: Figure 1 is a perspective view illustrating my invention open and about to be applied to the seat of the vehicle, the covering being illustrated by dotted lines only, in order to better disclose the construction of the bows and other details. Fig. 2 is a section on a line corresponding to $x$ of Fig. 1 illustrating the catch used to secure the top of the seat of a vehicle, together with the socket adapted for receiving this catch, the dotted line indicating the position which the spring may assume. Fig. 3 is a similar view illustrating the catch in position in the socket. Fig. 4 is a section on the line corresponding to $y$ of Fig. 1, better illustrating the mounting of the main brace as well as the details of the side-curtain roller. Fig. 5 is a detail perspective view of the holder for the side-curtain roller. Fig. 6 is a detail of the joint in one of the braces. Fig. 7 is a perspective view illustrating my invention in folded position. Figs. 8 and 9 are detail views illustrating the construction of the joints in the bows, as well as the manner of securing the cover to the bows. Fig. 10 is a section on the line corresponding to $z$ of Fig. 1 illustrating the construction of the back-curtain roller. Fig. 11 is a longitudinal sectional view illustrating the construction of one of the side-curtain rollers. Fig. 12 is a perspective view illustrating the manner of attaching the side and rear curtains, part of the covering being illustrated as broken away. Fig. 13 is a detail perspective view illustrating the manner of mounting and guiding the side-curtains. Fig. 14 is a detail perspective view of one of the loops adapted for fastening the back-curtain.

As I prefer to embody my invention, supports 1 are provided with catches 2 and 3 adapted to engage within sockets 4 and 5 on the seat of the vehicle. Each of these catches consists in a spring 6 secured to a lug 7, preferably by means of a rivet 8, and bearing against the lower member of the support 1 to maintain it in position, the lug 7 being rigidly secured to this lower member of the support 1. The surface of this lug 7 adjacent to the spring 6 is inclined away from the spring so that a recess is provided into which the spring may be compressed, allowing the lug and the spring to enter the socket and bring the offset part 9 of the spring below the lower edge of the socket. This offset part 9 will then engage with the lower edge of the socket to prevent the removal of the catch therefrom, while the removal may be conveniently effected by drawing the springs 6 on the catches 2 and 3 toward each other by means of the thumb and finger.

Pivoted to the front part of the supports 1 on pins 10 are the bows 11, 12, 13 and 14, which bows are provided with folding braces 15, 16 and 17 on one side, and $15^a$, $16^a$ and $17^a$ on the other side, these braces being constructed with the toggle-joints 18, as is customary in the construction of such braces for vehicle tops. Similar, but longer, main braces 19 and $19^a$, having toggle joints 18 are pivoted to the bow 14 and to brackets 20 and $20^a$ secured on the supports 1 near their rear ends. These brackets are constructed with the collars 21 concentric with the pivotal connections of the braces 19 and $19^a$, and the collars are adapted to receive and support the bow 14 when it is folded down, suitable clips 22 being provided for engagement with the collars 21. It will be understood that the braces with their toggle-joints are for the purpose of allowing the bows to be readily folded together and to be folded down upon the supports, while at the same time forming secure means of maintaining the bows in unfolded position ready for use. To further secure the bows against forward movement when in position for use, I provide the straps 23 attached to the bow 14 and to the supports 1 near the rear ends of said supports. Preferably the supports 1 are given upward bends where they receive the brackets 20, as well as where they receive the straps 23.

Each one of the bows is provided at each side near the top with a toggle-joint 24 somewhat similar to the toggle-joints 18 on the braces, so that in addition to folding the bows together and down upon the support, the side members of the bows, together with the supports, may be folded inward toward the top transverse members of the bows, as is best illustrated in Fig. 7 of the drawings. Preferably the bows are constructed of tubes to secure desirable lightness, the side members of the bows being flattened, and tapered toward their pivotal connection with the supports 1, as is usual in the construction of vehicle tops.

The bow 14 has the side-curtain rollers 25 pivoted to the inner sides of its side members, the shafts 26 of the side-curtain rollers being provided with the offsets 27 and eyes 28 for this purpose. The lower ends of the shafts 26 are provided with eyes 29 adapted to engage with studs 30 on the rearward parts of the supports 1, the offset portions 27 of the shafts 26 being preferably made resilient so that a slight spring of the shafts is necessary in order to engage the eyes 29 with the stud 30, thus insuring their being maintained in position. Since the upper end of the shaft 26 is pivoted on the inside of the bow 14, and the shaft is necessarily provided with the offset 27 to allow sufficient room for the side-curtain roller 25, the shaft 26 must be inclined outward to the side member of the bow 14 in order to allow the side-curtain roller 25 to enter the holder 52. This inclination also facilitates the engagement of the eye 29 with the stud 30 on the outside of the support 1 at the rear, allowing the shaft 26 and the side-curtain roller 25 supported thereon to swing from the holder 52 toward the stud 30, substantially through a single plane, avoiding twisting and consequent strain on the pivoted connection at the eye 28. When the side-curtain roller is thus adjusted, as is best illustrated in Fig. 12 of the drawings, the side-curtain 31 may be pulled forward, unwinding from the roller against the action of the spiral spring 32 which is secured inside the roller, as is best illustrated in Fig. 11 of the drawings. As a support for the side-curtain 31 while being drawn forward, I provide a cord 33 secured to the bow 14 at the rear by stud 34, and to the bow 11 at the front by means of stud 34$^a$, and I provide the side-curtain at its forward upper corner with a ring 35, through which the cord 33 passes. When the curtain 31 is pulled completely forward, this ring may be engaged with the stud 34$^a$ to hold the curtain in forwardly stretched position.

The cover 36 is stretched over the bows and secured to them by means of strips 37 passing around the bows and stitched to the cover, as is best illustrated in Figs. 8 and 9 of the drawings where the seams of stitching are represented at 38. This cover 36 is provided with flaps 39 hanging down past the toggle-joints 24 of the bows and adapted to lap over the side-curtains 31 when they have been drawn forward. These flaps 39 are provided with suitable hooks 40, and the side-curtains are provided with suitable eyes 41 at corresponding distances apart, wich may be engaged to hold up the side-curtain. These side-curtains 31 may be further secured by means of buttoning them over studs or knobs 42 on the forward bow 11 and over similar studs or knobs 43 on the lower members of the supports 1.

Mounted on the bow 14 above the toggle-joints 24 are the clips 44, in which are secured against rotation the shaft 45 of the back-curtain roller 46, which is rotatably mounted on said shaft. A suitable ratchet, similar to that used on shade rollers, is provided at one end of the roller 46, and the spiral spring 48 is secured at one end to the roller 46, and at the other end to the shaft 45, the ratchet being placed in such relative position that it tends to prevent the rotation of the roller 46, due to the action of the spiral spring 48. The back-curtain 49 is secured on the roller 46, so that when it is pulled down, it resists the action of the spring 48 and will be drawn quickly upward when the ratchet 47 is released. As will be understood, this ratchet allows the curtain to be adjusted up or down as may be found convenient. The rear of the flap 39 laps over the roller 46, and the back-curtain 49. When this back-curtain 49 has been drawn completely down, it may be secured at its sides by means of loops 50, which may be looped over buttons 51 on the side-curtains adjacent to the rollers 25, thus insuring a completely closed top when desired.

In folding the top after the back-curtain and side-curtains have been rolled onto their rollers, the side-curtain rollers 25 may be swung forward and secured in the holders 52, which consist in flat springs bent to embrace the rollers with their curtains rolled upon them, these springs being secured by being riveted onto collars 53 which pass around the side parts of the bow 14. The rings 35 remaining in engagement with the studs 34, the curtains will be held tight on the rollers by the action of the springs 32 within the rollers, when the top is to be folded. It will thus be seen that the attachment of my improved top to a vehicle, as well as its removal therefrom, may be accomplished conveniently and quickly, while the top, when in folded position, occupies comparatively little space and may be stored in the vehicle ready for use at any time. It is thus especially adapted for use with runabouts and other vehicles which are furnished without tops, but upon which a top is found desirable at times.

As illustrated in the drawings, the sockets 4 and 5 are secured to the seat by means of plates 54 and 55, which are screwed to the sides and bottom of the seat. Where the forms of the seats on the vehicles vary, these plates may vary accordingly, so that it will be understood that sockets 4 and 5 may be attached to the vehicle in any convenient manner. In view of this, as well as other changes which may be found expedient, I do not wish to be understood as limiting myself to the details herein shown and specifically described, but

What I claim as new and desire to secure by Letters Patent is:

1. In a vehicle top, bows comprising side members and top transverse members, toggle-joints between said side members and said top transverse members, pivotal connections between said bows, braces adapted to hold said bows apart, toggle-joints in said braces, supports for said bows, braces adapted to hold said bows in raised position, and toggle-joints in said braces whereby said bows may be folded down on said supports, and said supports and the side members of said bows may be folded toward the top transverse members of said bows, substantially as and for purposes specified.

2. In a vehicle top, bows comprising side members and top transverse members pivoted together, supports for said bows, a cover supported by said bows, side-curtain rollers adjustably mounted on one of said bows, studs on said supports adapted to hold said side-curtain rollers in position for use, side-curtains mounted on said side-curtain rollers, springs adapted to roll the side-curtains on the side-curtain rollers, holders adapted to hold said side-curtain rollers adjacent said bow, guides for said side-curtains, studs and rings adapted to hold said side-curtains in stretched position, a back-curtain roller mounted on one of said bows parallel to the top transverse member of said bow, a back-curtain mounted on said back-curtain roller, a spring in said back-curtain roller adapted to roll the back-curtain on the back-curtain roller, loops whereby said back-curtain may be lapped over said side-curtain roller and attached to said side-curtains, flaps on said cover adapted to lap over the side-curtains and the back-curtain, means whereby said vehicle top may be conveniently attached to and detached from a vehicle, and whereby said curtains may be conveniently adjusted to allow said bows to be folded down on said supports, and said side members and supports folded inward toward the top transverse members of said bows, substantially as and for the purposes specified.

3. In a vehicle top, bows comprising side members and top transverse members pivoted together, supports for said bows, concentric pivotal connections between said supports and said bows whereby said bows may be folded down on said supports and the side members of the bows and said supports may be folded inward toward the top transverse members of said bows, a side-curtain roller, a shaft for said side-curtain roller, a pivotal connection between said shaft and one of said bows, a stud on one of said supports, an eye on said shaft adapted to engage with said stud to hold said side-curtain roller in position for use, and a holder on one of said bows adapted to hold said side-curtain roller out of position for use, said shaft being so inclined that said side-curtain roller may swing from said holder towards said stud to allow the engagement of the shaft with the stud, substantially in a single plane.

BERNARD H. SCHEPER.

Witnesses:
JAMES N. RAMSEY,
CLARENCE PEIDEW.